(12) United States Patent
Watkins

(10) Patent No.: US 10,843,302 B2
(45) Date of Patent: Nov. 24, 2020

(54) COLUMN ROTATOR

(71) Applicant: Timothy J. Watkins, Sarasota, FL (US)

(72) Inventor: Timothy J. Watkins, Sarasota, FL (US)

(73) Assignee: Steel Services Inc., Indianapolis, IN (US)

( * ) Notice: Subject to any disclaimer, the term of this patent is extended or adjusted under 35 U.S.C. 154(b) by 100 days.

(21) Appl. No.: 16/238,620

(22) Filed: Jan. 3, 2019

(65) Prior Publication Data

US 2019/0202011 A1    Jul. 4, 2019

Related U.S. Application Data

(60) Provisional application No. 62/613,267, filed on Jan. 3, 2018.

(51) Int. Cl.
*B23K 37/047* (2006.01)
*B23K 37/053* (2006.01)
*B23K 101/06* (2006.01)

(52) U.S. Cl.
CPC ........ *B23K 37/047* (2013.01); *B23K 37/0538* (2013.01); *B23K 2101/06* (2018.08)

(58) Field of Classification Search
CPC ................ B23B 13/126; B23K 37/053; B23K 37/0538; B23Q 1/40; B23Q 1/527; B23Q 1/76–766; B23Q 3/06; B23Q 3/062
See application file for complete search history.

(56) References Cited

U.S. PATENT DOCUMENTS

| | | | | |
|---|---|---|---|---|
| 1,328,492 | A * | 1/1920 | Carman | B27M 3/28 144/12 |
| 1,389,068 | A * | 8/1921 | Olson | B25H 1/00 269/70 |
| 1,615,860 | A * | 2/1927 | Williams | B25B 1/22 269/76 |
| 2,320,079 | A * | 5/1943 | Hartwig | B23K 37/0452 269/69 |
| 2,740,331 | A * | 4/1956 | Schwartz | B23D 3/04 409/143 |
| 2,741,830 | A * | 4/1956 | Lewis | B25H 1/0007 269/17 |
| 2,931,644 | A * | 4/1960 | Kenworthy | B25H 1/0007 269/17 |
| 3,038,734 | A * | 6/1962 | Else | B23Q 1/527 269/129 |
| 3,125,904 | A * | 3/1964 | Olivieri | B23Q 3/104 408/199 |
| 3,521,875 | A * | 7/1970 | Kapelsohn | B23K 37/0452 269/58 |
| 3,606,033 | A * | 9/1971 | Barilla | B23K 37/0452 414/777 |

(Continued)

FOREIGN PATENT DOCUMENTS

WO    WO-2016091389 A1 * 6/2016 ............. B23Q 1/525

*Primary Examiner* — Tyrone V Hall, Jr.
(74) *Attorney, Agent, or Firm* — Barnes & Thornburg LLP

(57) ABSTRACT

A rotator is disclosed. The rotator includes a base and a mounting ring supported by the base. The rotator further includes a plurality of rollers on which the mounting ring rests when the rotator is fully assembled. The rotator is configured to support a steel column and allow rotation of the steel column to facilitate fabrication of the steel column.

18 Claims, 7 Drawing Sheets

(56) References Cited

U.S. PATENT DOCUMENTS

| | | | | |
|---|---|---|---|---|
| 3,868,101 A * | 2/1975 | Nozaki | ............ | B23K 37/0452 269/25 |
| 4,202,539 A * | 5/1980 | Polastri | ................ | B23Q 1/527 269/287 |
| 4,491,307 A * | 1/1985 | Ellefson | ............ | B23K 37/0452 269/246 |
| 4,540,872 A * | 9/1985 | Siler | ................ | B23K 37/0538 219/159 |
| 5,904,347 A * | 5/1999 | Lin | .................. | B23K 37/0452 269/76 |
| 5,975,512 A * | 11/1999 | Lin | ........................ | B23Q 7/02 269/296 |
| H002061 H * | 4/2003 | Tunnell | ........................ | 410/44 |
| 8,496,237 B2 * | 7/2013 | Rolle | ................ | B23K 37/0452 269/287 |
| 8,714,536 B2 * | 5/2014 | Stadtfeld | ................ | B23F 23/06 269/287 |
| 9,815,151 B2 * | 11/2017 | Simmons | ........... | B23K 37/0533 |
| 9,945,351 B2 * | 4/2018 | Lulker | ................ | F03D 13/40 |

\* cited by examiner

COLUMN ROTATOR

This Application claims priority under 35 U.S.C. § 119(e) to U.S. Provisional Application Ser. No. 62/613,267, filed Jan. 3, 2018, which is expressly incorporated by reference herein.

BACKGROUND

The present disclosure relates to rotator designs and, more specifically, to a design for a steel column rotator.

TECHNICAL FIELD

Raw materials such as metal may be molded into various structural components to be used in forming metal structures. Such structural components include steel columns. Metal fabrication is the machining and combination of the structural components to form the metal structures. The steel columns may be large and cumbersome and, therefore, difficult to maneuver while forming the metal structures during fabrication.

SUMMARY

According to one aspect of the disclosure, an apparatus comprises a base having a foundation positioned on a floor. A first plate is coupled to the foundation and includes a first arcuate channel. A second plate is coupled to the foundation and is spaced apart from the first plate. The second plate includes a second arcuate channel aligned with the first arcuate channel.

The apparatus further includes a plurality of rollers positioned between the first plate and the second plate. The plurality of rollers are arranged circumferentially around the first arcuate channel and the second arcuate channel.

The apparatus further includes a mounting ring removably positioned on the plurality of rollers. The mounting ring has a column aperture sized to receive a structural column. The mounting ring is configured to rotate on the plurality of rollers about a central axis.

BRIEF DESCRIPTION OF THE DRAWINGS

The detailed description particularly refers to the following figures, in which.

DETAILED DESCRIPTION OF THE DRAWINGS

Figure 1:
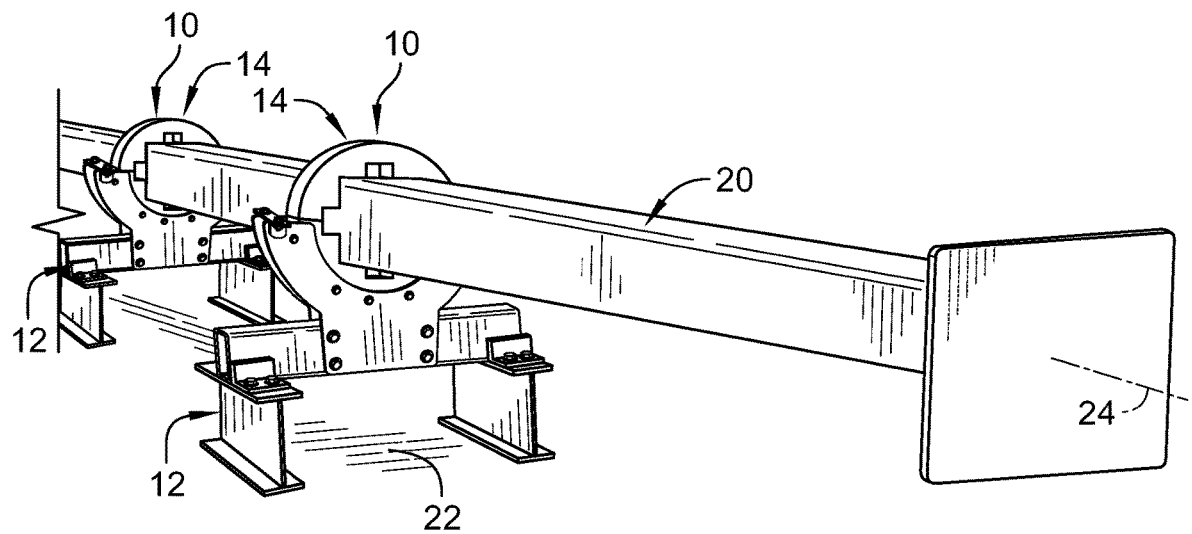
FIG. 1 is a perspective view of a pair of column rotators and a steel column mounted on the rotators.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a pair of column rotators 10 are shown. Each column rotator 10 includes a base 12 and a mounting ring 14 configured to engage and support a steel column 20 during fabrication. The rotators 10 cooperate to support the steel column 20 horizontally above a floor 22. The steel column 20 may be rotated about a central axis 24 by the steel rotators 10 so that a user has access to all sides of the steel column 20.

In the illustrative embodiment, the base 12 is formed from metallic material such as, for example, steel. The base 12 includes a foundation 18 to support the rotator 10 on the floor 22. The foundation 18 has two spaced-apart parallel beams 26, 28, or support structures 26, 28, positioned on the floor 22. The beams 26, 28 in the illustrative embodiment are I-beams 26, 28. However, it should be appreciated that any suitable structure may be used to support the rotator 10 on the floor 22 depending on the size of the steel column 20.

Figure 2:
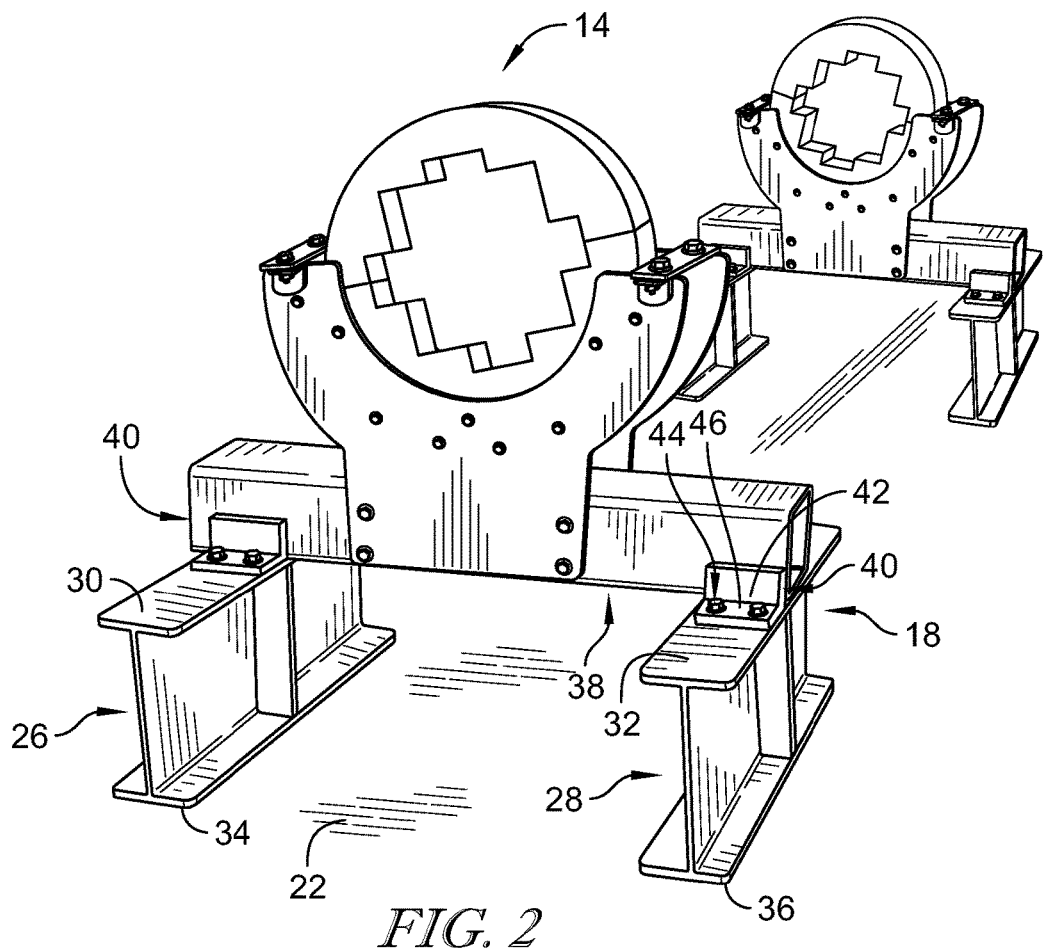
FIG. 2 is a perspective view of the rotators of FIG. 1.

As shown in FIG. 2, each I-beam 26, 28 has top surfaces 30, 32 facing upwardly away from the floor 22 and bottom surfaces 34, 36 facing downwardly and engaged with the floor 22. A cross-beam 38 extends from the first I-beam 26 to the second I-beam 28 and is coupled to the top surfaces 30, 32 generally in the middle of the I-beams 26, 28. L-shaped brackets 40 secure the cross-beam 38 to each I-beam 26, 28. In the illustrative embodiment, a first flange 42 of the brackets 40 is welded to the cross-beam 38 while fasteners 44 couple a second flange 46 of the brackets 40 to the I-beams 26, 28. It should be appreciated that any suitable method of coupling the cross-beam 38 to the I-beams 26, 28 may be used.

Figure 3:
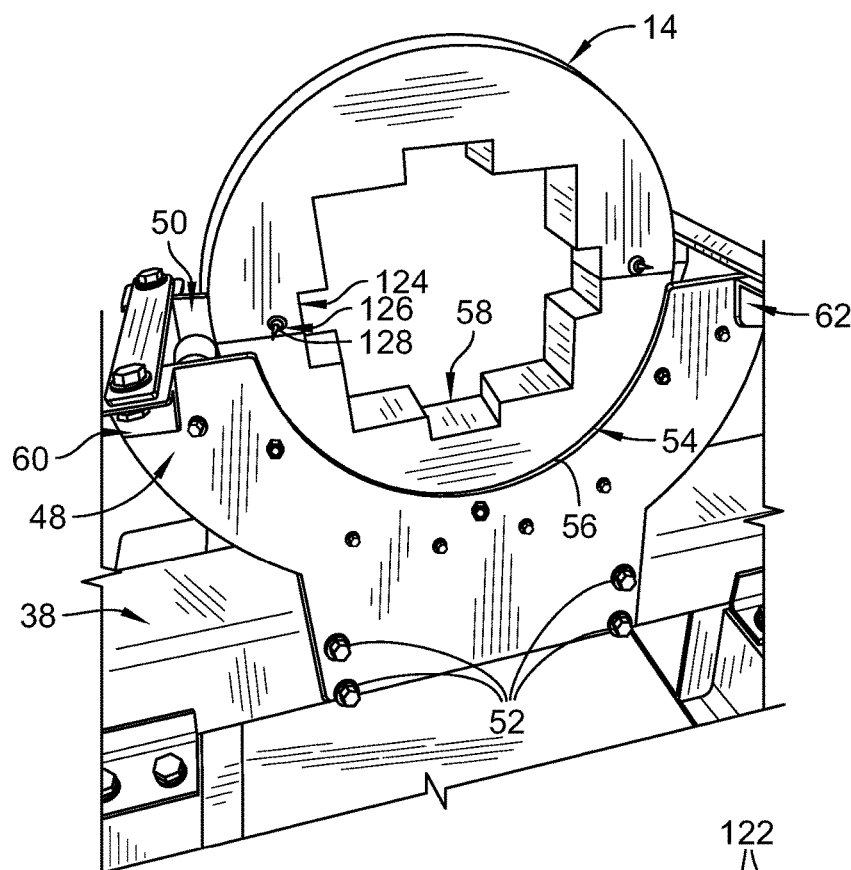
FIG. 3 is another perspective view of one rotator of FIGS. 1-2.
Figure 4:
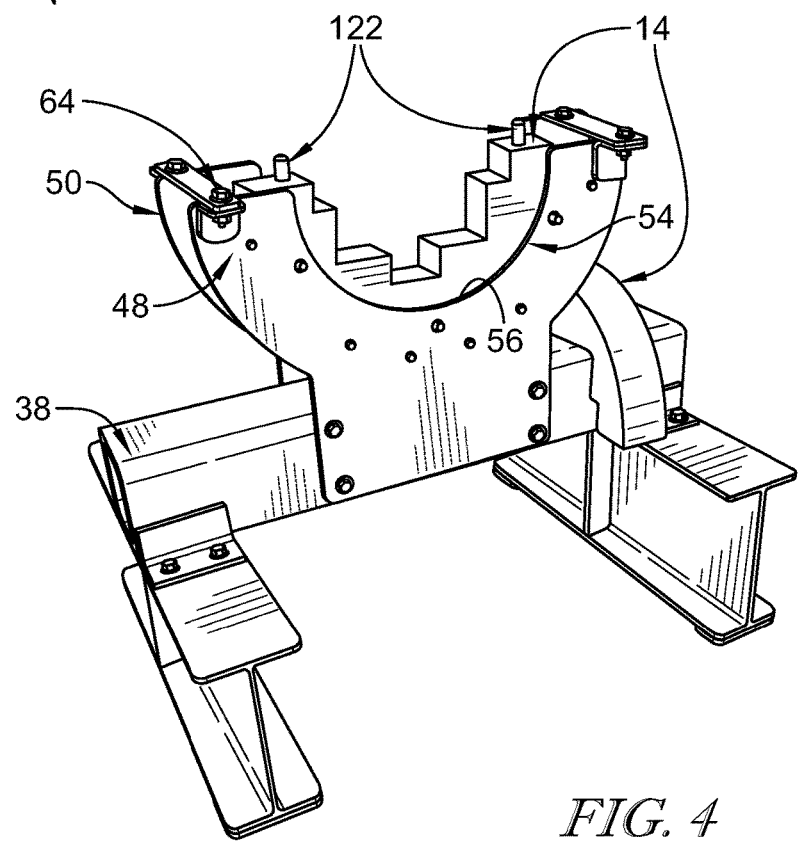
FIG. 4 is another perspective view of the steel rotator of FIG. 3 with part of a mounting ring of the rotator removed.

As shown in FIGS. 3 and 4, two spaced-apart parallel plates 48, 50 are coupled to the cross-beam 38 generally in the middle of the cross-beam 38. The plates 48, 50 extend upwardly from the cross-beam 38. Each plate 48, 50 is coupled to opposite side surfaces of the cross-beam 38. In the illustrative embodiment, a plurality of fasteners 52 couple the plates 48, 50 to the cross-beam 38. However, it should be appreciated that any suitable method of coupling the plates 48, 50 to the cross-beam 38 may be used such as, for example, welding.

Each plate 48, 50 includes an arcuate or semi-circular channel 54 defined by arcuate surfaces 56, 58 on respective plates 48, 50. The arcuate surfaces 56, 58 share a common origin with the central axis 24. The semi-circular channels 54 define a pair of arms 60, 62 on each of the plates 48, 50. In the illustrative embodiment, the arms 60, 62 also have a semi-circular shape. However, it should be appreciated that any suitable shape for the arms 60, 62 may be used.

Figure 5:
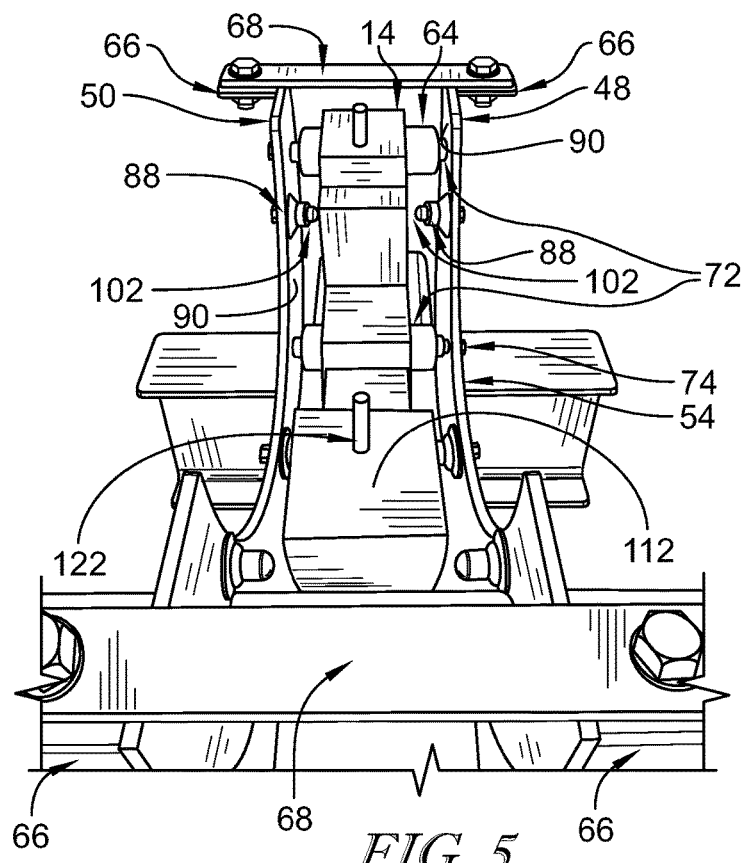
FIG. 5 is a top perspective view of the rotator of FIG. 4 with part of the mounting ring removed.

As shown in FIGS. 4 and 5, the plates 48, 50 are spaced apart axially from one another to provide a space 64 axially between the plates that receives the mounting ring 14. L-shaped brackets 66 are coupled to distal ends of each arm 60, 62 of the plates 48, 50. Support links 68 are coupled to the brackets 66 and extend between each plate 48, 50 on the distal end of respective arms 60, 62. The support links 68 block axial movement and bending of the support plates 48, 50 relative to the central axis 24.

In the illustrative embodiment, the mounting ring 14 is formed from plastic material such as, for example, urethane. However, it should be appreciated that other materials may be used to manufacture the mounting ring 14. The mounting ring 14 is precast using a mold to include a diameter that corresponds to the base 12 and a column aperture 70 that corresponds to the steel column 20 being fabricated.

Figure 6:
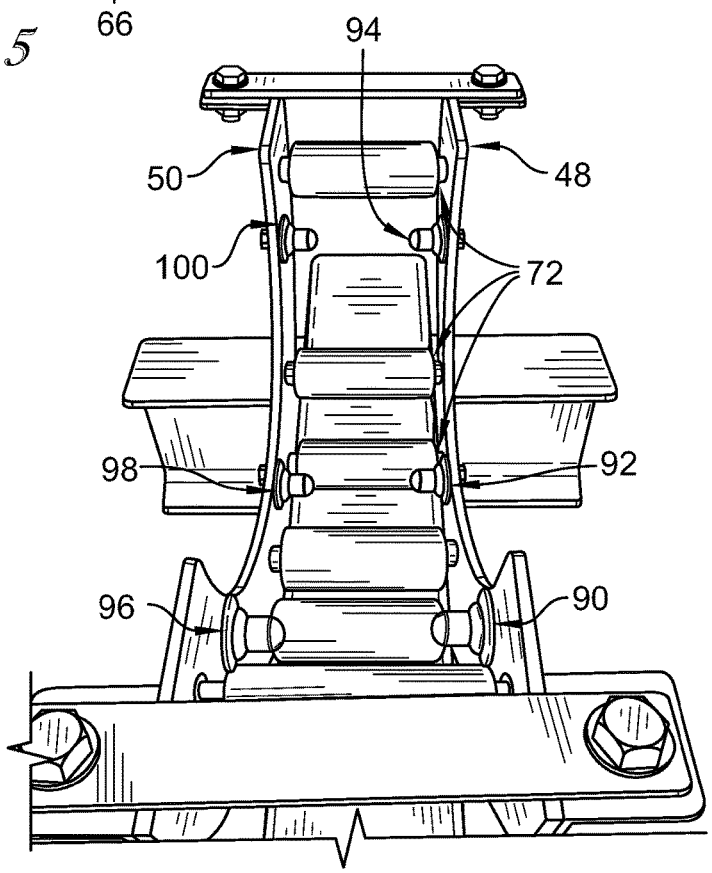
FIG. 6 is a top perspective view of the steel rotator of FIG. 5 with the mounting ring removed.

As shown in FIGS. 5 and 6, the mounting ring 14 is supported on the base 12 by a plurality of rollers 72 extending between the plates 48, 50 in the space 64. The plurality of rollers 72 are spaced apart from one another circumferentially around the semi-circular channels 54 equal radial distances from the central axis 24. The rollers 72 are coupled to the plates 48, 50 by fasteners 74.

Figure 7:
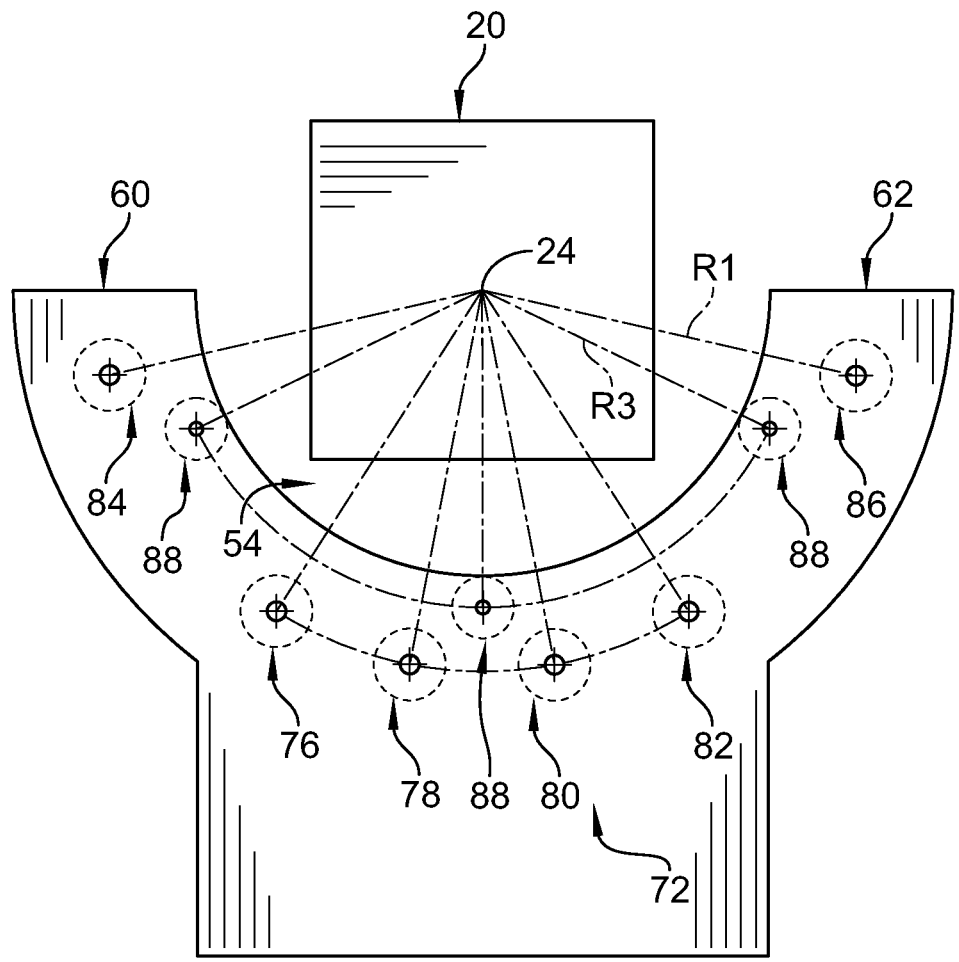
FIG. 7 is a diagrammatic view of the rotator and the steel column of FIG. 1.

As shown in FIG. 7, six rollers 72 are spaced circumferentially around the central axis 24. Four roller bearings 76, 78, 80, 82 are located above the cross-beam 38 to bear force-loads acting downward from the steel column 20. Fifth and sixth roller bearings 84, 86 are positioned on opposite arms 60, 62 of the first and second support plates 48, 50 to block lateral movement of the mounting ring 14 and the steel column 20 relative to the central axis 24. As such, the rollers 72 have a semi-circular arrangement that is spaced apart from the central axis 24 by a radius R1.

In the illustrative embodiment, the rollers 72 are Ashland Conveyor® roller bearings and have a diameter of about 2.5 inches and a length between frames (BF) of about 8 inches. It should be appreciated that any suitable size of the rollers 72 may be used.

Turning again to FIGS. 5 and 6, spacing is maintained between the mounting ring 14 and the first and second plates 48, 50 by a plurality of spacers 88 coupled to inner surfaces 90 of the first and second plates 48, 50. The plurality of spacers 88 extend axially toward the mounting ring 14 to limit axial movement of the mounting ring 14 relative to the central axis 24. The plurality of spacers 88 are positioned circumferentially around the semi-circular channel 54 formed in each plate 48, 50.

In the illustrative embodiment, three spacers 90, 92, 94 are coupled to the first plate 48 and three spacers 96, 98, 100 are coupled to the second plate 50. However, it should be appreciated that any suitable number of spacers 88 may be used. Spacers 90 and 96 are aligned axially with one another and are positioned on respective first arms 60 of the first and second plates 48, 50. Spacers 94 and 100 are aligned axially with one another and are positioned on respective second arms 62 of the first and second plates 48, 50. Spacers 92 and 98 are aligned axially with one another and are positioned between respective first and second arms 60, 62 of the first and second plates 48, 50.

In the illustrative embodiment, a gap 102 is provided between the spacers 88 and the mounting ring 14 on axial sides of the mounting ring 14. The gap 102 allows the mounting ring 14 to rotate freely on the rollers 72 unimpeded by friction from the spacers 88 or the plates 48, 50. In the illustrative embodiment, the spacers 88 are about 1.5 inches long having a black oxide steel flange/threaded stud with a working load limit of about 150 lbs. and are manufactured by Ashland Conveyor®. The spacers 88 further include a single ball bearing 104 on the end of each spacer 88 to minimize friction between the mounting ring 14 and the spacers 88 if the mounting ring 14 comes into contact with the spacers 88 during operation.

As shown in FIG. 7, the spacers 88 and the rollers 72 are positioned circumferentially around the channel 54 and have a common origin that is coincident with the central axis 24. The spacers 88 are positioned radially inward of the rollers 72. The spacers 88 are located radially outward from the central axis 24 by a radius R3 that is less than the radii R1 of the rollers 72. The rollers 72 and the spacers 88 may be adjusted on the first and second plates 48, 50 to accommodate mounting rings of varying sizes such as, for example, a mounting ring 14 with a larger or smaller diameter. It should be appreciated that the rotator 10 may be formed to fit a mounting ring having any suitable size diameter.

Figure 8:
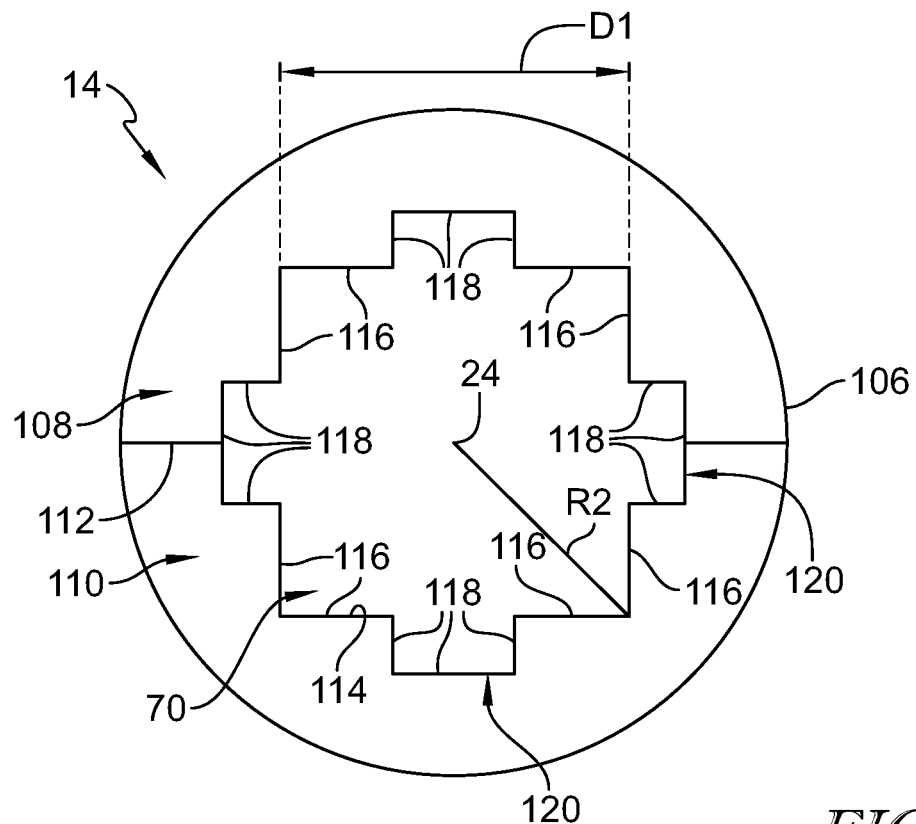
FIG. 8 is a diagrammatic view of the mounting ring of the rotator of FIG. 4.

As shown in FIG. 8, the mounting ring 14 is cylindrical and has an outer surface 106 that forms a circumference of the mounting ring 14. The outer surface 106 of the mount ring 16 engages the plurality of rollers 72 as the column 20 is rotated about the central axis 24. The mounting ring 14 shares a common origin that is coincident with the central axis 24. The outer surface 106 of the mount ring 14 is spaced apart radially from the central axis by a radius R2. The radius R2 is relatively smaller than the radius R1 and is relatively larger than the radius R3.

The mounting ring 14 has a first side component 108 and a second side component 110 that combine to form the column aperture 70. Each side component includes interface surfaces 112 that engage one another when the mounting ring 14 is fully assembled.

Figure 9:
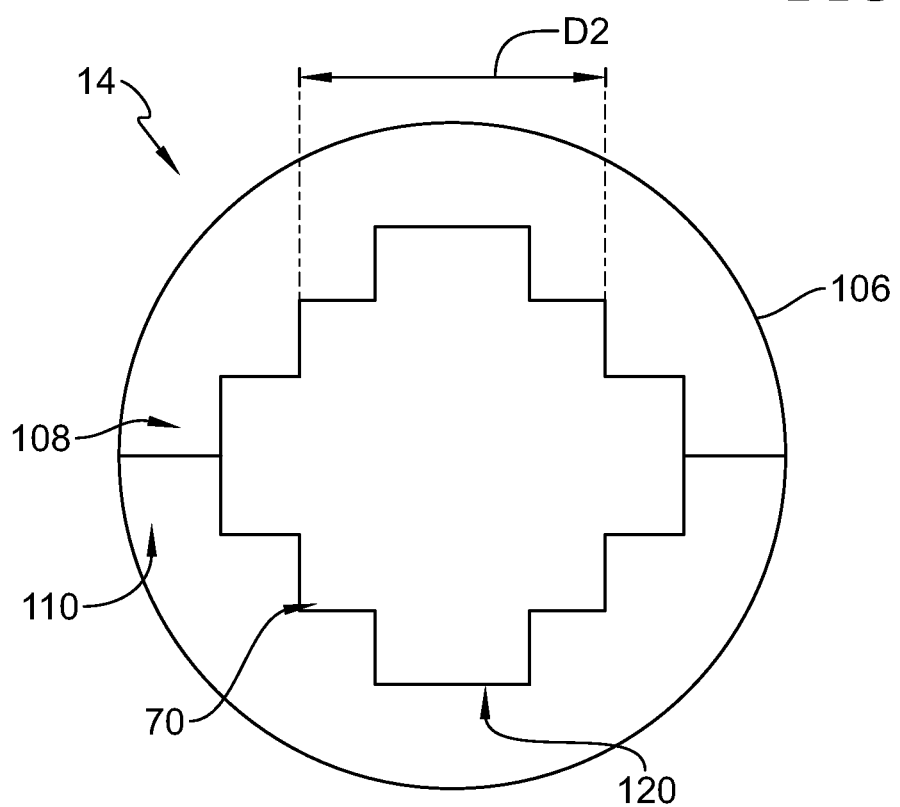
FIG. 9 is a diagrammatic view of another embodiment of a mounting ring for use with the rotator of FIG. 1.
Figure 10:
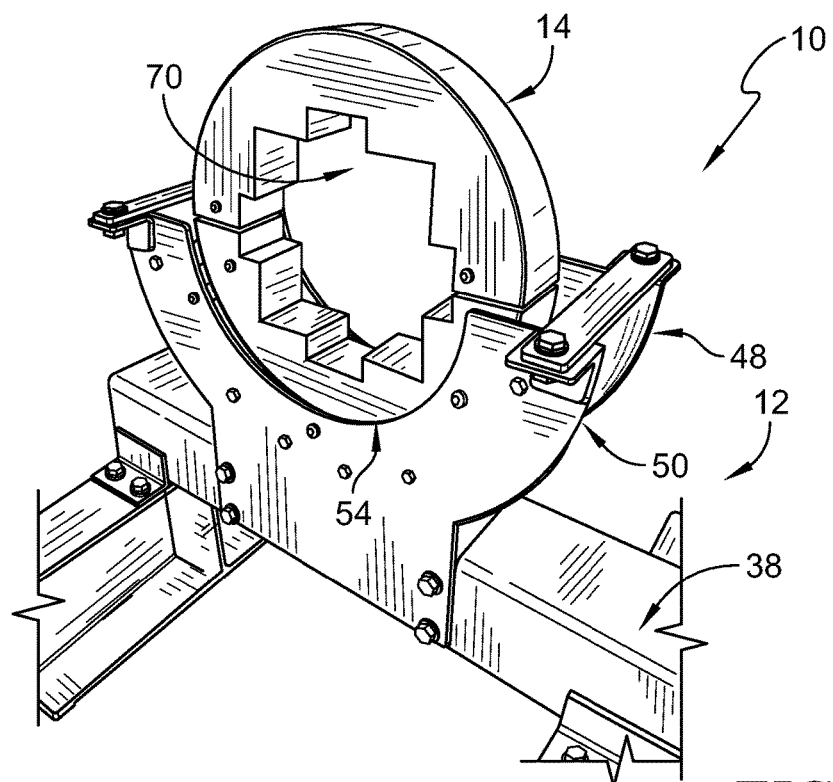
FIG. 10 is another perspective view of the rotator.
Figure 11:
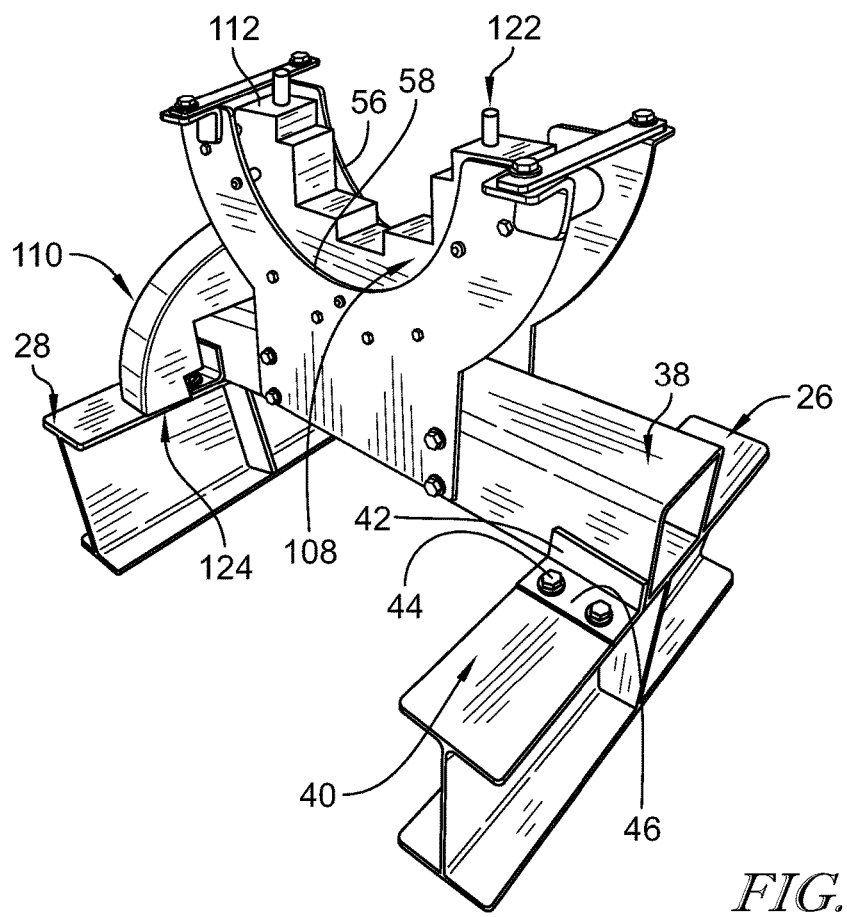
FIG. 11 is another perspective view of the rotator with part of the mounting ring removed.
Figure 12:
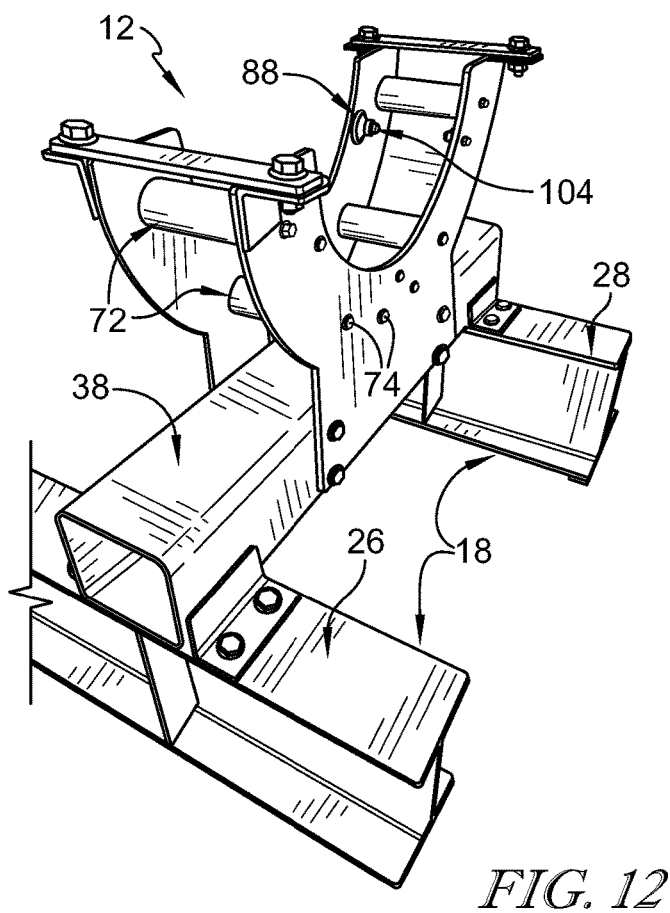
FIG. 12 is another perspective view of the rotator with the mounting ring removed.

The column aperture 70 is sized and shaped to receive the steel column 20 as suggested in FIGS. 8 and 9. The side components of the mount ring 16 include an inner surface 114 that define the column aperture 70 when the mount ring 16 is fully assembled. The inner surfaces 114 of the side components 108, 110 include column surfaces 116 and notch surfaces 118. The column surfaces 116 form right angles in respective corners of the column aperture 70 that correspond to corners of the steel column 20. The notch surfaces 118 define notches 120 that are located between each corner of the column aperture 70. It should be appreciated that the column aperture 70 may be sized and shaped to receive any sized steel column or beam as will be described in greater detail below.

As shown in FIGS. 8 and 9, the column aperture 70 of the mounting ring 14 may be sized and shaped to fit steel columns of varying sizes. For example, the column aperture 70 may be sized to fit a 12.5 in. by 12.5 in. steel column as shown in FIGS. 8 and 9. However, mounting ring 14 may be formed to include any suitable sized column aperture 70 that is appropriate for the types of steel columns being fabricated with the steel rotators 10. For example, the column aperture 70 may be sized to have a first dimension D1, as shown in FIG. 8, or a second dimension D2 that is smaller than D1, as shown in FIG. 9.

The mounting ring 14 is also formed to include the notches 120 that face the steel column 20 on all four sides of the steel column 20. The notches 120 are rectangular openings between the mounting ring 14 and the steel column 20 to allow a user to pass a measuring device (not shown) therethrough. As such, the user may measure a length of the steel column 20 while the steel column is mounted on the steel rotators 10.

Turning again to FIGS. 3-5, the first side component 108 is identical to the second side component 110 except the first side component 108 includes mount posts 122 extending from the interface surface 112 of the first side component 108. The second side component 110 is formed to include complementary post spaces 124 that receive the mount posts 122 to couple the first side component 108 to the second side component 110. The first side component 108 and the second side component 110 of the mounting ring 14 are held together by gravity as the mounting ring 14 and the steel column 20 are rotated about the central axis 24. However, in some embodiments, the second side component 110 includes axially-extending slots 126 aligned with the mount posts 122. The axially-extending slots 126 receive bolts 128, or pins, therein. The bolts 128 extend through corresponding slots formed in the mount posts 122 to secure the first side component 108 to the second side component 110.

In use, the side components 108, 110 of the mounting ring 14 are separated such that one of the side components is set on the base 12. The steel column 20 is then lifted onto the side component that is set on the base 12. The other side component is then assembled to the other side component such that the mount posts 122 extend into the post spaces 124. The steel column 20 may then rotate about the central axis 24 as the mounting ring 14 rotates along the rollers 72.

Figure 13:
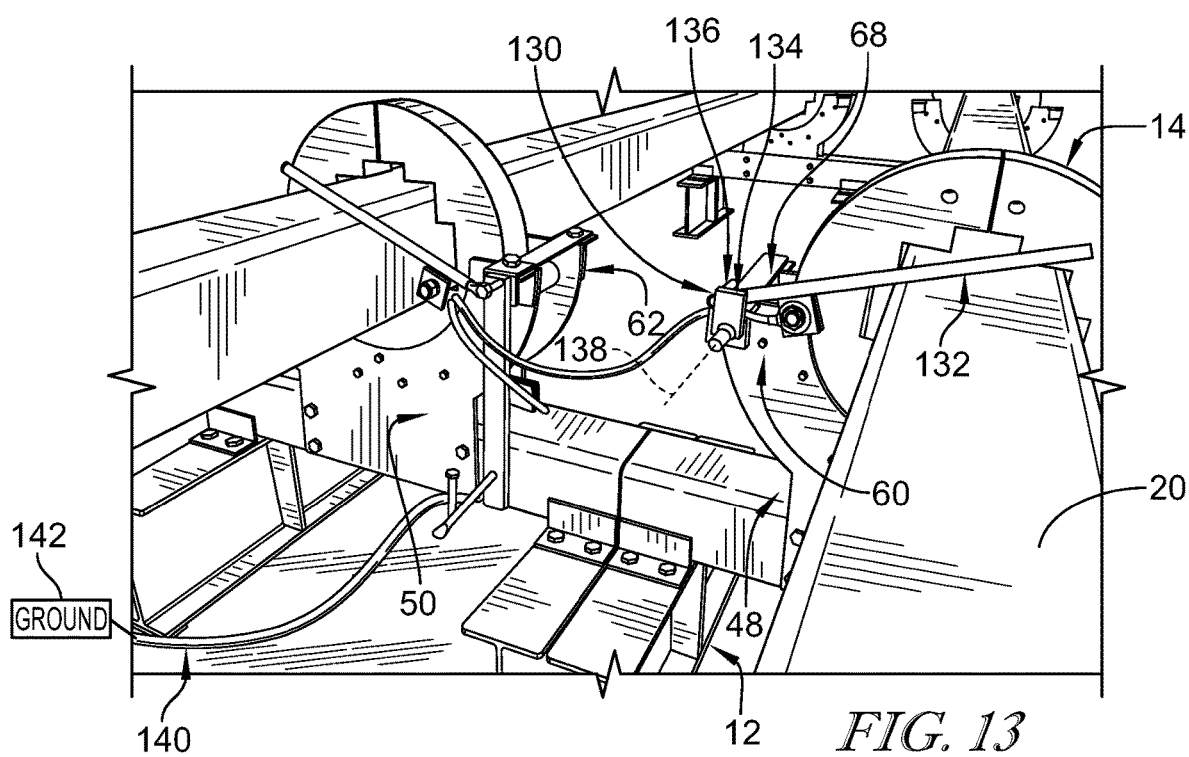
FIG. 13 is another perspective view of the rotator including a ground circuit for use during welding of the steel column.

Referring now to FIG. 13, the steel column 20 may be grounded using a ground circuit 130 when the rotator 10 is used for welding processes on the steel column 20 to protect the user. The ground circuit 130 includes a conductive component 132 engaged with the steel column 20. Illustratively, the component 132 is a metallic bar, however, it should be appreciated that the component 132 may be any suitable device for conducting electricity such as, for example, a clamp or a plate.

The ground circuit 130 further includes a mounting bracket 134 coupled to the base 12 and the component 130. The mounting bracket 134 is mounted to one of the arms 60, 62 of the one of the plates 48, 50. Illustratively, the mounting bracket 134 is coupled to one of the arms 60, 62 using the fastener that mounts the support link 68 to the base 12. A proximate end 136 of the component 132 is mounted to the mounting bracket 134 and configured to pivot about an axis 138 such that the component is cantilevered toward the steel column 20. The component 132 is pulled into engagement with the steel column by gravity so that the component is constantly engaged with the column 20 during the welding processes.

A wire lead 140 is coupled to one of the component 132 and the mounting bracket 134 and is grounded at 142 to complete the circuit as suggested in FIG. 13. Ground 142 may be a conductive structure located in the vicinity of the rotator 10, a ground inlet on a welding machine (not shown), or any other suitable device or method of grounding. The cantilevered component 132 allows the steel to remain grounded as the steel column 20 is rotated about the axis 24 without the wire lead 140 becoming twisted or tangled.

The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. An apparatus, comprising:
   a base comprising:
   a foundation positioned on a floor,
   a first plate coupled to the foundation and including a first channel, and
   a second plate spaced apart from the first plate and coupled to the foundation, the second plate including a second channel aligned with the first channel,
   a plurality of rollers positioned between the first plate and the second plate, the plurality of rollers being arranged circumferentially around the first channel and the second channel,
   a mounting ring removably positioned on the plurality of rollers, the mounting ring having a central aperture sized to receive a structural column, and
   a plurality of spacers that are configured to engage the mounting ring, each spacer coupled to one of the first and second plates and positioned between the first and second plates,
   wherein the mounting ring is configured to rotate on the plurality of rollers about a central axis.

2. The apparatus of claim 1, wherein the first and second channels are arcuate and concave relative to the central axis.

3. The apparatus of claim 2, wherein the arcuate channels are semi-circular.

4. The apparatus of claim 1, wherein the foundation includes a first support structure, a second support structure spaced apart from the first support structure, and a crossbeam coupled to and interconnecting the first and second support structures.

5. The apparatus of claim 4, wherein the first and second plate are coupled to the crossbeam and each plate includes a pair of arms that extend upwardly away from the crossbeam.

6. The apparatus of claim 5, wherein each arm has an arcuate surface, and the arcuate channels are defined by the arcuate surfaces.

7. The apparatus of claim 1, wherein the plurality of rollers include a first roller positioned below the mounting ring, a second roller positioned on a first lateral side of the mounting ring, and a third roller positioned on a second lateral side of the mounting ring opposite the first lateral side.

8. The apparatus of claim 7, wherein the plurality of rollers further includes fourth, fifth, and sixth rollers positioned below the mounting ring.

9. The apparatus of claim 1, wherein the plurality of spacers extend inwardly toward the mounting ring to provide a space between the mounting ring and the first and second plates.

10. The apparatus of claim 9, wherein the plurality of rollers are spaced apart from the central axis a first radius and the plurality of spacers are spaced apart from the central axis a second radius less than the first radius.

11. The apparatus of claim 1, wherein the mounting ring includes a first side component and a second side component that cooperate to define the central aperture.

12. The apparatus of claim 11, wherein each of the side components includes interface surfaces that engage one another when the mounting ring is fully assembled and the first side component includes mounting posts extending outwardly from the interface surface of the first side component and the second side component includes posts spaces sized to receive the mount posts when the mounting ring is fully assembled.

13. The apparatus of claim 12, wherein the second side component further includes axially extending slots that are sized to receive pins, and the pins are configured to extend through corresponding slots formed in the mounting posts to secure the first side component to the second side component.

14. An apparatus, comprising:
a base comprising:
a foundation,
a first plate coupled to the foundation and including a first channel, and
a second plate spaced apart from the first plate and coupled to the foundation, the second plate including a second channel aligned with the first channel,
a plurality of rollers positioned between the first plate and the second plate,
a mounting ring removably positioned on the plurality of rollers, the mounting ring having a central aperture sized to receive a structural column, and
a ground circuit coupled to the base, the ground circuit including a conductive component engaged with the structural column, and wherein the component is cantilevered such that gravity constantly pulls the component into engagement with the structural column,
wherein the mounting ring is configured to rotate on the plurality of rollers about a central axis.

15. An apparatus comprising,
a first side component, and
a second side component, the first and second side components at least partially defining a central aperture, the central aperture sized to receive a structural column so that the structural column may be rotated,
wherein each of the side components includes interface surfaces that engage one another, and wherein the first and second side components each include an inner surface defining the central aperture and the inner surface includes a plurality of column surfaces that are configured to engage the structural column and a plurality of notch surfaces that are spaced apart from the structural column and define at least one notch, and
wherein the first and second side components comprise a plastic material.

16. The apparatus of claim 15, wherein the first side component includes mounting posts that extend outwardly from the interface surface of the first side component and the second side component includes posts spaces sized to receive the mount posts when the mounting ring is fully assembled.

17. The apparatus of claim 15, wherein the second side component further includes axially extending slots that are sized to receive pins, and the pins are configured to extend through corresponding slots formed in the mounting posts to secure the first side component to the second side component.

18. The apparatus of claim 15, wherein the apparatus further includes a base comprising a foundation positioned on a floor, a first plate coupled to the foundation and including a first channel, and a second plate spaced apart from the first plate and coupled to the foundation, the second plate including a second channel aligned with the first channel, and a plurality of rollers positioned between the first plate and the second plate, the plurality of rollers being arranged circumferentially around the first channel and the second channel, wherein the mounting ring is configured to rotate on the plurality of rollers about a central axis at a center of the central aperture.

* * * * *